United States Patent
Gu

(10) Patent No.: US 12,552,479 B2
(45) Date of Patent: Feb. 17, 2026

(54) BICYCLE PARKING DEVICE WITH ADJUSTABLE LENGTH

(71) Applicant: Haidong Gu, Montclair, CA (US)

(72) Inventor: Haidong Gu, Montclair, CA (US)

(73) Assignee: CYCLINGDEAL USA, INC., CA (US)

(*) Notice: Subject to any disclaimer, the term of this patent is extended or adjusted under 35 U.S.C. 154(b) by 0 days.

(21) Appl. No.: 18/986,714

(22) Filed: Dec. 19, 2024

(65) Prior Publication Data

US 2025/0162670 A1      May 22, 2025

Related U.S. Application Data

(63) Continuation-in-part of application No. 18/513,639, filed on Nov. 20, 2023, now Pat. No. 12,208,848.

(51) Int. Cl.
| | | |
|---|---|---|
| *B62H 3/06* | (2006.01) | |
| *B62H 3/04* | (2006.01) | |
| *B62H 3/08* | (2006.01) | |

(52) U.S. Cl.
CPC ............. *B62H 3/06* (2013.01); *B62H 3/04* (2013.01); *B62H 3/08* (2013.01); *B62H 2700/00* (2013.01)

(58) Field of Classification Search
CPC ........ B62H 3/04; B62H 3/08; B62H 2700/00; B62H 3/06
USPC ......................................... 211/20, 21, 23, 24
See application file for complete search history.

(56) References Cited

U.S. PATENT DOCUMENTS

| | | | | |
|---|---|---|---|---|
| 511,367 | A * | 12/1893 | Slater ................ | B62H 3/00 211/23 |
| 529,939 | A * | 11/1894 | Noderer ............. | B62H 3/08 211/20 |
| 556,789 | A * | 3/1896 | Walker .............. | B62H 3/08 211/20 |
| 556,806 | A * | 3/1896 | Chandler ........... | B62H 3/08 211/20 |
| 557,470 | A * | 3/1896 | Young ............... | B62H 3/08 211/20 |
| 562,669 | A * | 6/1896 | Smart ................ | B62H 3/08 211/20 |
| 574,689 | A * | 1/1897 | Stover ............... | B62H 3/08 211/20 |
| 585,917 | A * | 7/1897 | Lang ................. | B62H 3/08 211/20 |
| 590,443 | A * | 9/1897 | Temple ............. | B62H 3/04 211/21 |
| D27,769 | S * | 10/1897 | Pine .................. | D12/115 |
| 603,422 | A * | 5/1898 | Burkhardt ......... | B62H 3/00 211/20 |

(Continued)

FOREIGN PATENT DOCUMENTS

| | | | | |
|---|---|---|---|---|
| CA | 1222722 A | * | 6/1987 | ........... B62H 3/04 |
| CA | 2507984 A1 | * | 11/2006 | ........... B62H 3/04 |

(Continued)

*Primary Examiner* — Stanton L Krycinski

(57) ABSTRACT

A bicycle parking device with adjustable length includes a base and a parking tube assembly which is connected to the base and has a limiting tube assembly and a fixed tube assembly. The limiting tube assembly has an accommodation space. An elastic limiting member is movably connected to the limiting tube assembly and is movable up and down relative to the limiting tube assembly to adjust the size of the accommodation space.

13 Claims, 19 Drawing Sheets

(56) References Cited

U.S. PATENT DOCUMENTS

| | | | | |
|---|---|---|---|---|
| 620,863 A * | 3/1899 | Wilcox | ............. | B62H 3/04 211/21 |
| D36,091 S * | 9/1902 | Merritt | ............. | D12/115 |
| D201,143 S * | 5/1965 | Vigilante | ............. | D12/217 |
| 3,202,289 A * | 8/1965 | Burditt | ............. | B62H 3/04 211/22 |
| 3,348,697 A * | 10/1967 | Saunders | ............. | B62H 3/06 211/22 |
| 3,455,461 A * | 7/1969 | Kesling | ............. | B62H 3/06 211/171 |
| 3,785,500 A * | 1/1974 | Kennelly | ............. | B62H 3/04 D12/115 |
| 3,887,075 A * | 6/1975 | Harvey | ............. | B62H 3/00 211/5 |
| 4,033,459 A * | 7/1977 | Zach | ............. | B62H 3/10 211/20 |
| D245,596 S * | 8/1977 | Cohen | ............. | D12/115 |
| D301,217 S * | 5/1989 | Mailhot | ............. | D12/115 |
| 5,096,068 A * | 3/1992 | Theriault | ............. | B62H 3/04 211/20 |
| 5,133,461 A * | 7/1992 | Martinell | ............. | B62H 3/04 211/198 |
| D369,576 S * | 5/1996 | Johnson | ............. | D12/115 |
| 6,062,396 A * | 5/2000 | Eason | ............. | A47F 7/04 211/20 |
| 6,257,419 B1 * | 7/2001 | Kamysiak | ............. | B62H 3/00 211/22 |
| 6,868,976 B1 * | 3/2005 | Lassanske | ............. | B62H 3/08 211/21 |
| D507,511 S * | 7/2005 | Lassanske | ............. | D12/115 |
| 6,948,621 B1 * | 9/2005 | Lassanske | ............. | B62H 3/06 211/21 |
| D583,716 S * | 12/2008 | Ross | ............. | D12/115 |
| D602,403 S * | 10/2009 | Shaha | ............. | D12/115 |
| 8,342,339 B2 * | 1/2013 | Cole | ............. | B62H 3/04 211/22 |
| D719,491 S * | 12/2014 | Rayl | ............. | D12/115 |
| D719,492 S * | 12/2014 | Rayl | ............. | D12/115 |
| 8,905,245 B2 * | 12/2014 | Long | ............. | B62H 3/04 211/20 |
| 8,944,258 B2 * | 2/2015 | Chiu | ............. | B62H 3/06 211/195 |
| D778,788 S * | 2/2017 | Tsai | ............. | D12/115 |
| 9,592,868 B2 * | 3/2017 | Greenblatt | ............. | B62H 3/06 |
| 9,610,993 B1 * | 4/2017 | Ho | ............. | B62H 3/06 |
| 9,649,986 B2 * | 5/2017 | Pedrini | ............. | B60R 9/10 |
| 9,650,092 B1 * | 5/2017 | Tsai | ............. | B62H 3/08 |
| D863,117 S * | 10/2019 | Rossiter | ............. | D12/115 |
| 10,858,055 B2 * | 12/2020 | Drew | ............. | B62K 3/14 |
| 11,008,060 B1 * | 5/2021 | Liu | ............. | B62H 3/10 |
| 11,117,631 B2 * | 9/2021 | Gu | ............. | B62H 3/08 |
| 11,312,438 B1 * | 4/2022 | Gu | ............. | B62H 3/08 |
| 11,505,267 B1 * | 11/2022 | Gu | ............. | B62H 3/04 |
| 11,708,120 B1 * | 7/2023 | Striebel | ............. | B62H 3/12 211/21 |
| 11,839,966 B1 * | 12/2023 | Helmrich | ............. | B25H 1/0014 |
| 2003/0010729 A1 * | 1/2003 | Lopez De Luzuriaga | ............. | B62H 3/04 211/17 |
| 2004/0251219 A1 * | 12/2004 | Zimmerman | ............. | B62H 3/08 211/17 |
| 2006/0266717 A1 * | 11/2006 | Tsai | ............. | B62H 3/00 211/17 |
| 2007/0164065 A1 * | 7/2007 | Davis | ............. | B60R 9/10 224/324 |
| 2008/0000848 A1 * | 1/2008 | Chiu | ............. | B62H 3/04 211/21 |
| 2013/0264297 A1 * | 10/2013 | Long | ............. | B62H 3/04 211/20 |
| 2015/0360739 A1 * | 12/2015 | Ashlag | ............. | B62H 3/02 211/5 |
| 2017/0120974 A1 * | 5/2017 | Peruzzo | ............. | B62H 3/06 |
| 2020/0047833 A1 * | 2/2020 | Drew | ............. | B62K 3/14 |
| 2023/0192205 A1 * | 6/2023 | Rasmussen | ............. | B62H 3/04 211/20 |
| 2024/0083534 A1 * | 3/2024 | Hoadley | ............. | B60P 3/077 |

FOREIGN PATENT DOCUMENTS

| | | | | |
|---|---|---|---|---|
| CH | 712798 A2 * | 2/2018 | ............. | B62H 3/04 |
| DE | 29607760 U1 * | 7/1996 | ............. | B62H 3/04 |
| EP | 1555194 A1 * | 7/2005 | ............. | B62H 3/04 |
| EP | 3275771 B1 * | 4/2019 | ............. | B62H 3/04 |
| GB | 2574217 A * | 12/2019 | ............. | B62H 3/06 |

* cited by examiner

BICYCLE PARKING DEVICE WITH ADJUSTABLE LENGTH

BACKGROUND OF THE INVENTION

1. Fields of the Invention

The present invention is a Continuation-In-Part patent application of applicant's former patent application with the application Ser. No. 18/513,639, filed on Nov. 20, 2023.

2. Descriptions of Related Art

For aesthetic purposes and to avoid scratches or damage to the bicycle frame, most bicycles are not equipped with support stands on their frames. When parking a bicycle, it is usually leaned against a wall or laid flat on the ground, which may cause scratches to the frame.

Moreover, bicycles cannot be neatly arranged when parked, and collisions often occur during parking or when removing bikes from the parking area, causing bikes to fall over. Compared to the above situations, installing parking racks on the ground that allow bicycles to be arranged with proper spacing can reduce these problems.

The present invention intends to provide a bicycle parking device with adjustable length to eliminate the shortcomings mentioned above.

SUMMARY OF THE INVENTION

The present invention relates to a bicycle parking device which comprises a base and a parking tube assembly. The parking tube assembly is connected to the base and has a limiting tube assembly and a fixed tube assembly. The limiting tube assembly has an accommodation space. An elastic limiting member is movably mounted on the limiting tube assembly and can move up and down relative to the limiting tube assembly to adjust the size of the accommodation space.

The primary object of the present invention is to provide a bicycle parking device which provides a limiting tube assembly with an accommodation space, and an elastic limiting member movably connected to the limiting tube assembly. Through the elastic limiting member's ability to move up and down relative to the limiting tube assembly, it achieves the purpose of adjusting the size of the accommodation space. This allows the device to accommodate wheels of different sizes and prevents collisions when parking bicycles or removing them from the parking area.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
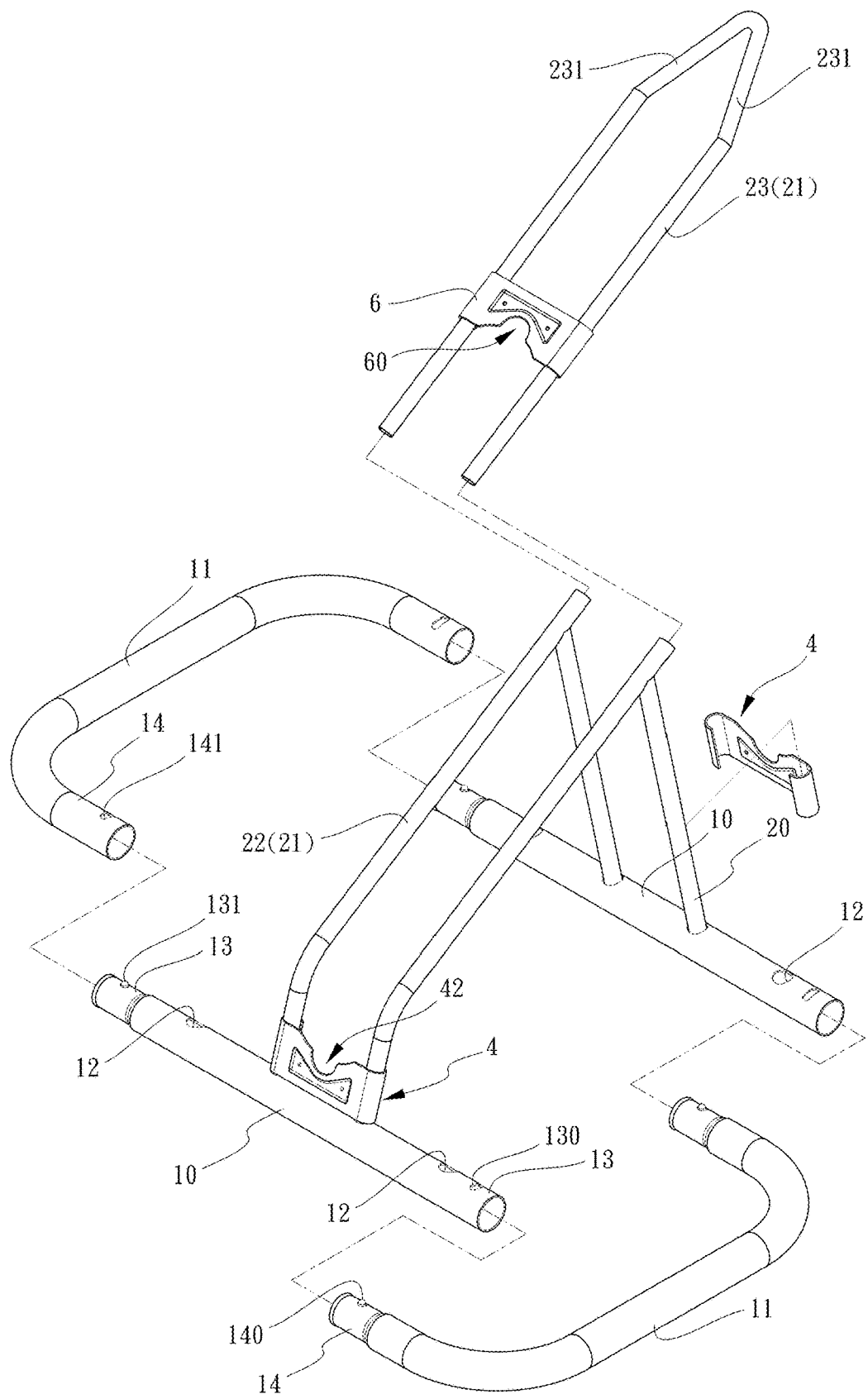
FIG. 1 is an exploded perspective view of the present invention.
Figure 2:
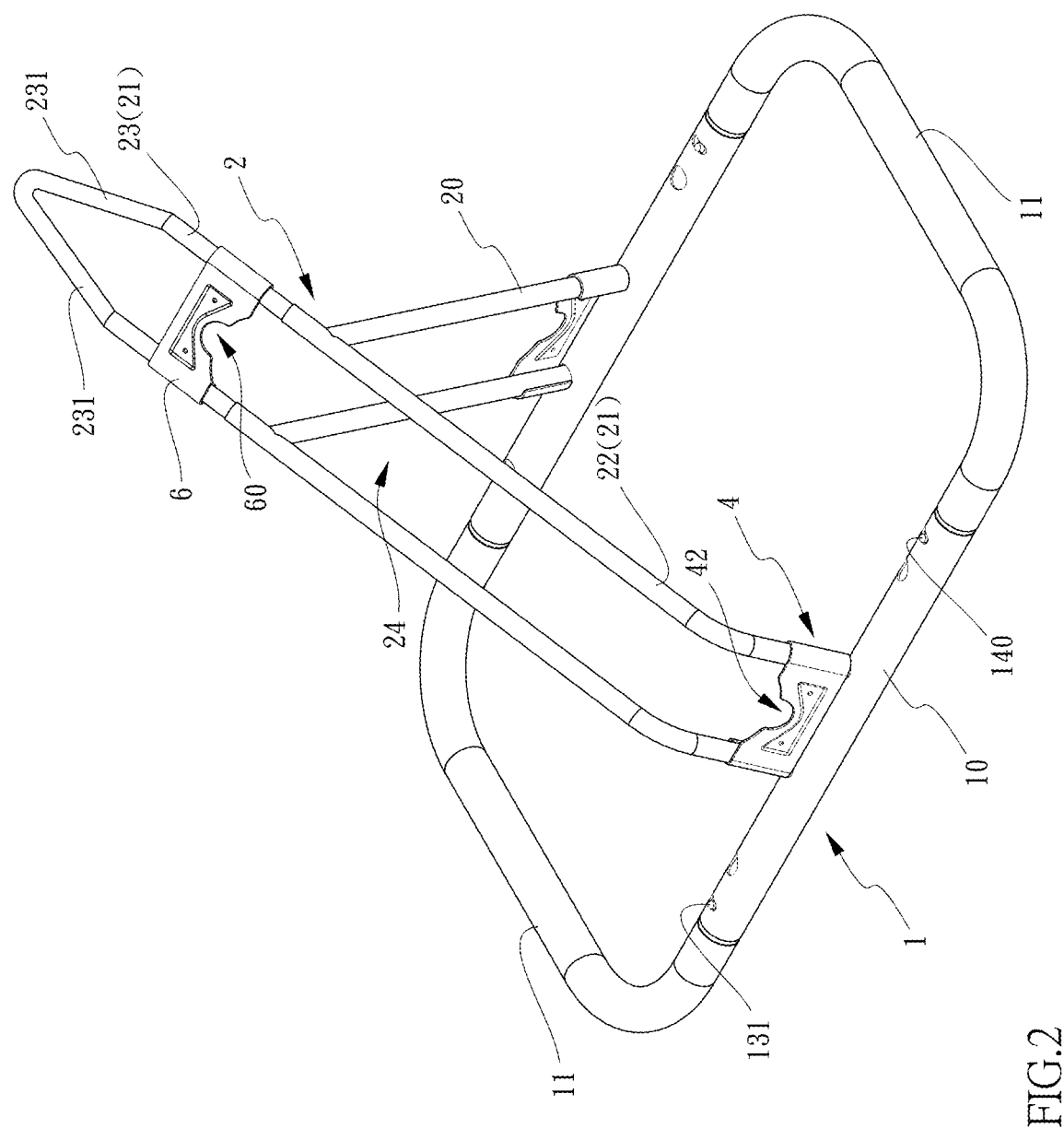
FIG. 2 is a perspective view of the present invention.
Figure 3:
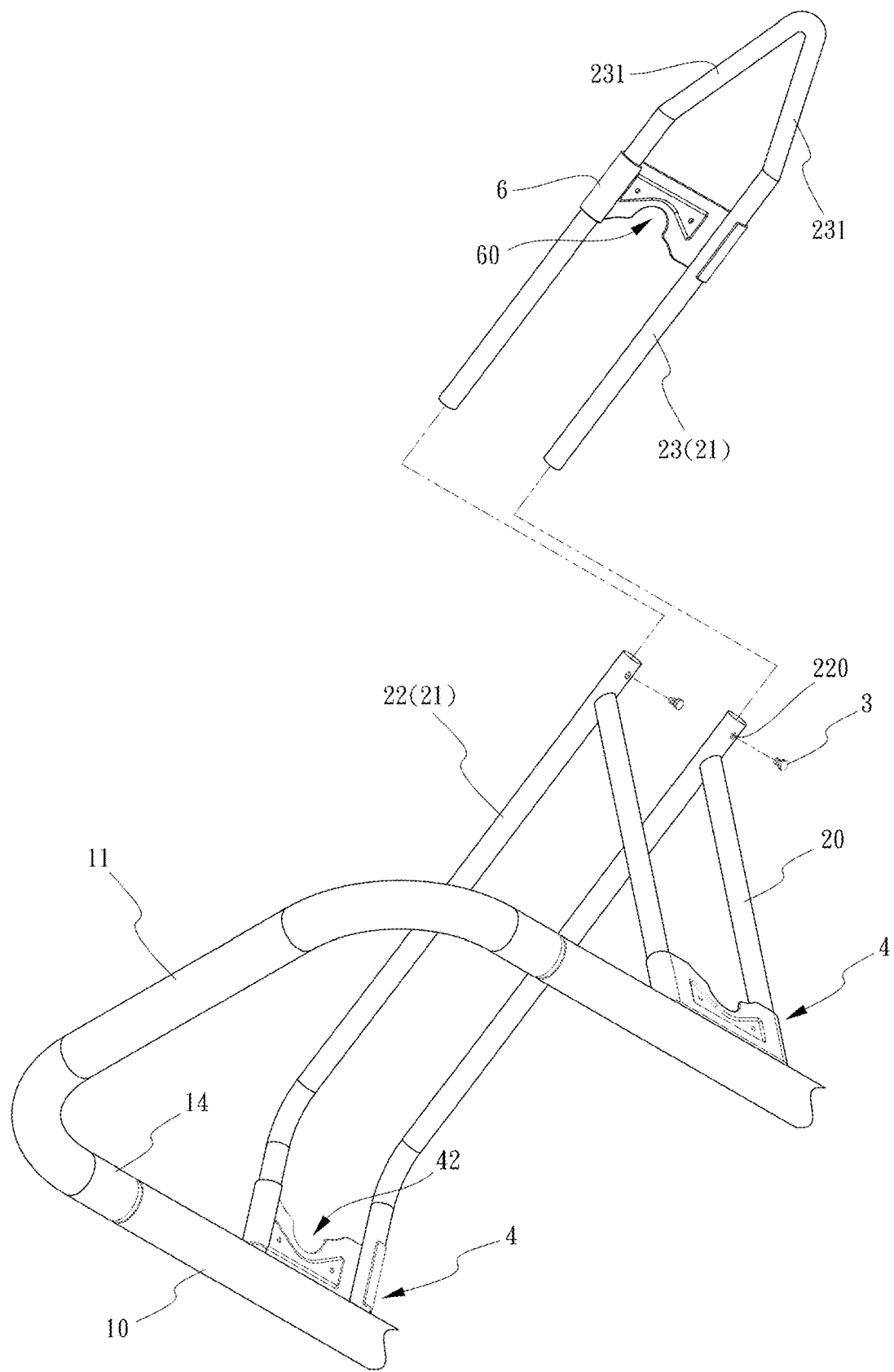
FIG. 3 is a partial exploded perspective view from another angle of the present invention.
Figure 4:
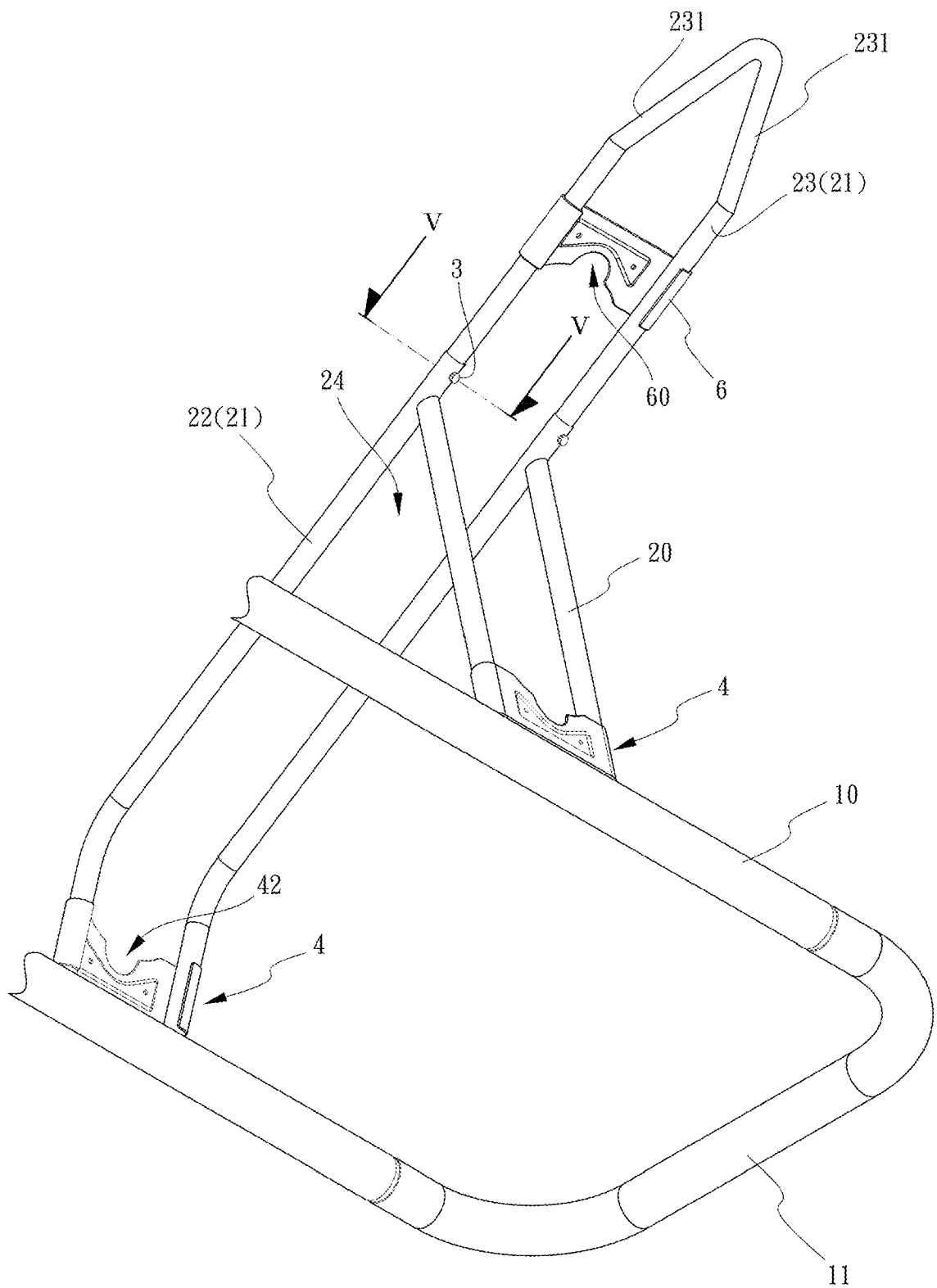
FIG. 4 is a partial assembled perspective view from another angle of the present invention.

Referring to FIGS. 1 to 19, the bicycle parking device with adjustable length of the present invention comprises a base 1 which includes has two long tubes 10 and two short tubes 11 that is assembled and disassembled with each other. Each long tube 10 has multiple adjustment holes 12 and first joining parts 13 at both ends. The short tubes 11 have second joining parts 14 at both ends corresponding to the first joining parts 13. In this embodiment, the first joining part 13 at one end of each long tube 10 has a first through hole 130, and the second joining part 14 of each short tube 11 corresponding to the first joining part 13 has a first elastic snap button 140. The first joining part 13 at the other end of each long tube 10 has a first through hole 130 and a second elastic snap button 131, while the second joining part 14 of each short tube 11 corresponding to the first joining part 13 has both a first elastic snap button 140 and a second through hole 141. In practice, the first joining parts 13 of each long tube 10 can be configured with either first through holes 130 or second elastic snap buttons 131 based on actual needs, and the corresponding first joining parts 13 of each long tube 10 can be connected through the engagement of first through holes 130 and second elastic snap buttons 131, thereby achieving the effect of expanding the base 1 size by combining multiple long tubes 10 to accommodate the number of bicycles to be parked.

Figure 5:
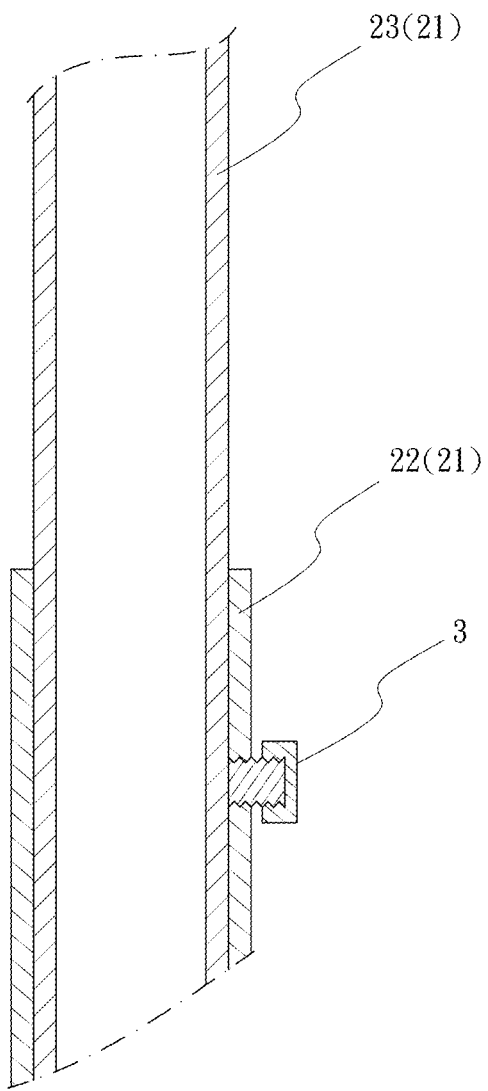
FIG. 5 is a cross-sectional view, taken along line V-V of FIG. 4 of the present invention.
Figure 6:
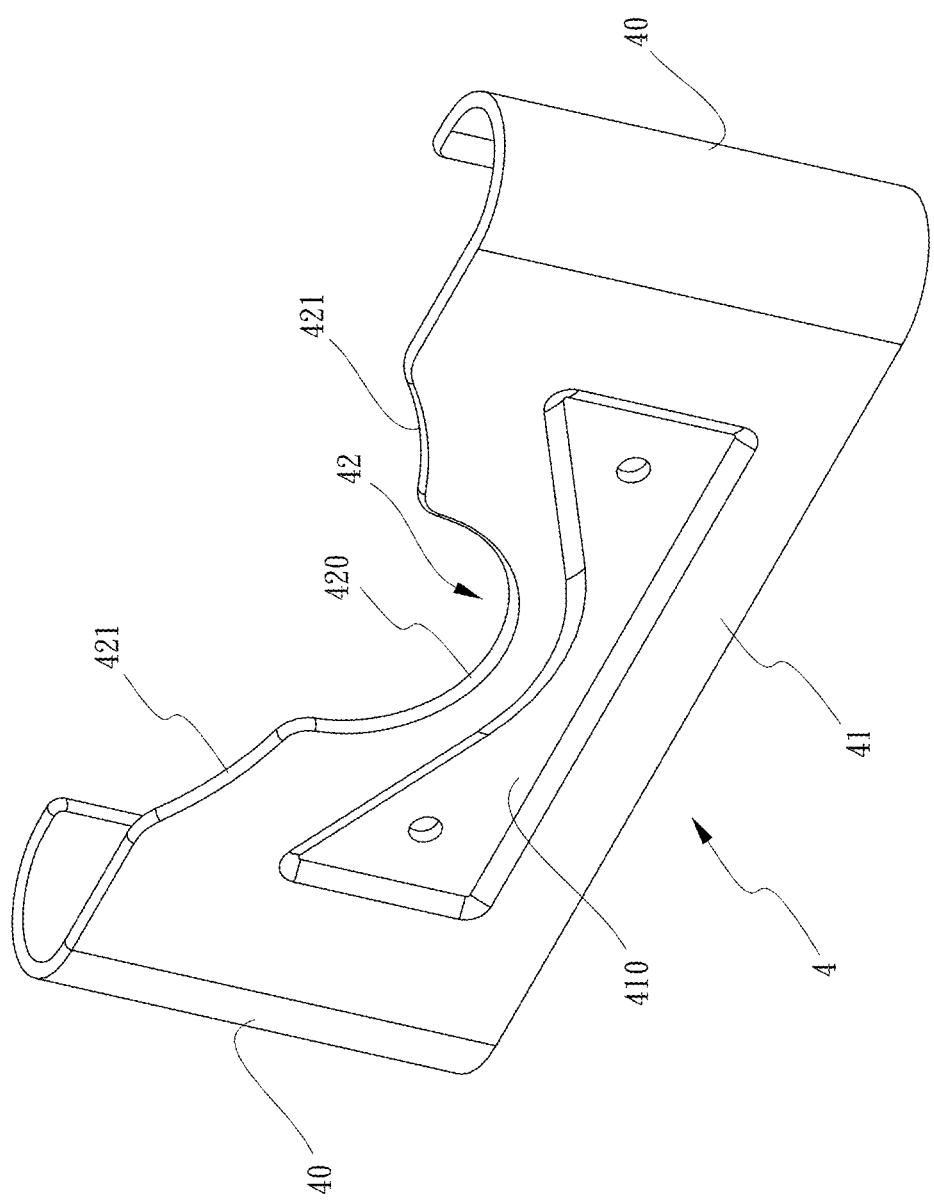
FIG. 6 is a perspective view of the wheel support member of the present invention.
Figure 7:
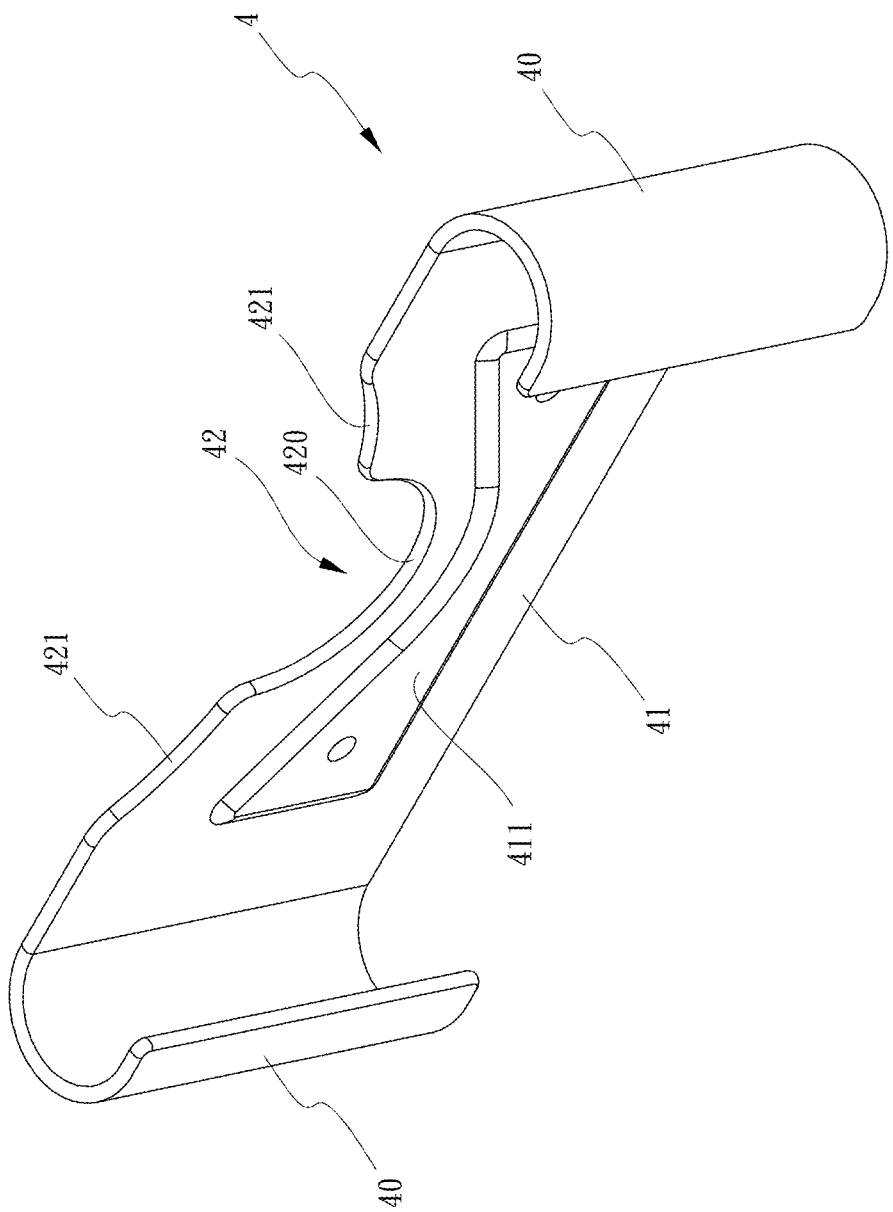
FIG. 7 is another perspective view from a different angle of the wheel support member of the present invention.

A parking tube assembly 2 is movably assembled to any of the adjustment holes 12 of the two long tubes 10 of the base 1 and has a fixed tube assembly 20 and a limiting tube assembly 21. The fixed tube assembly 20 and limiting tube assembly 21 are inclined to connect with each other. The limiting tube assembly 21 is composed of two first tubes 22 and two second tubes 23 inserted inside the two first tubes 22, and has an accommodation space 24. The accommodation space is for placing a wheel 5, and the limiting tube assembly 21 has two limiting tubes 231 at its end. The two limiting tubes 231 clamp both sides of the wheel 5. Additionally, the two first tubes 22 respectively have first positioning holes 220, and through a positioning member 3 passing through the first positioning holes 220 and abutting against the two second tubes 23 (as shown in FIG. 5), the two first tubes 22 and two second tubes 23 form an infinitely adjustable telescopic structure. In this embodiment, besides using the above-mentioned method where the positioning member 3 presses against the tube wall of the second tube 23, other structures can also be used for the infinitely adjustable telescopic structure, such as quick-release structure, elastic snap button structure, or rod roller structure.

An elastic limiting member 6 is movably mounted on the limiting tube assembly 21 and can be moved up and down relative to the limiting tube assembly 21 to adjust the size of the accommodation space 24. The elastic limiting member 6 has a limiting groove 60 concavely formed on one side corresponding to the wheel 5, with the limiting groove 60 positioned on the upper side of the wheel 5.

Figure 9:
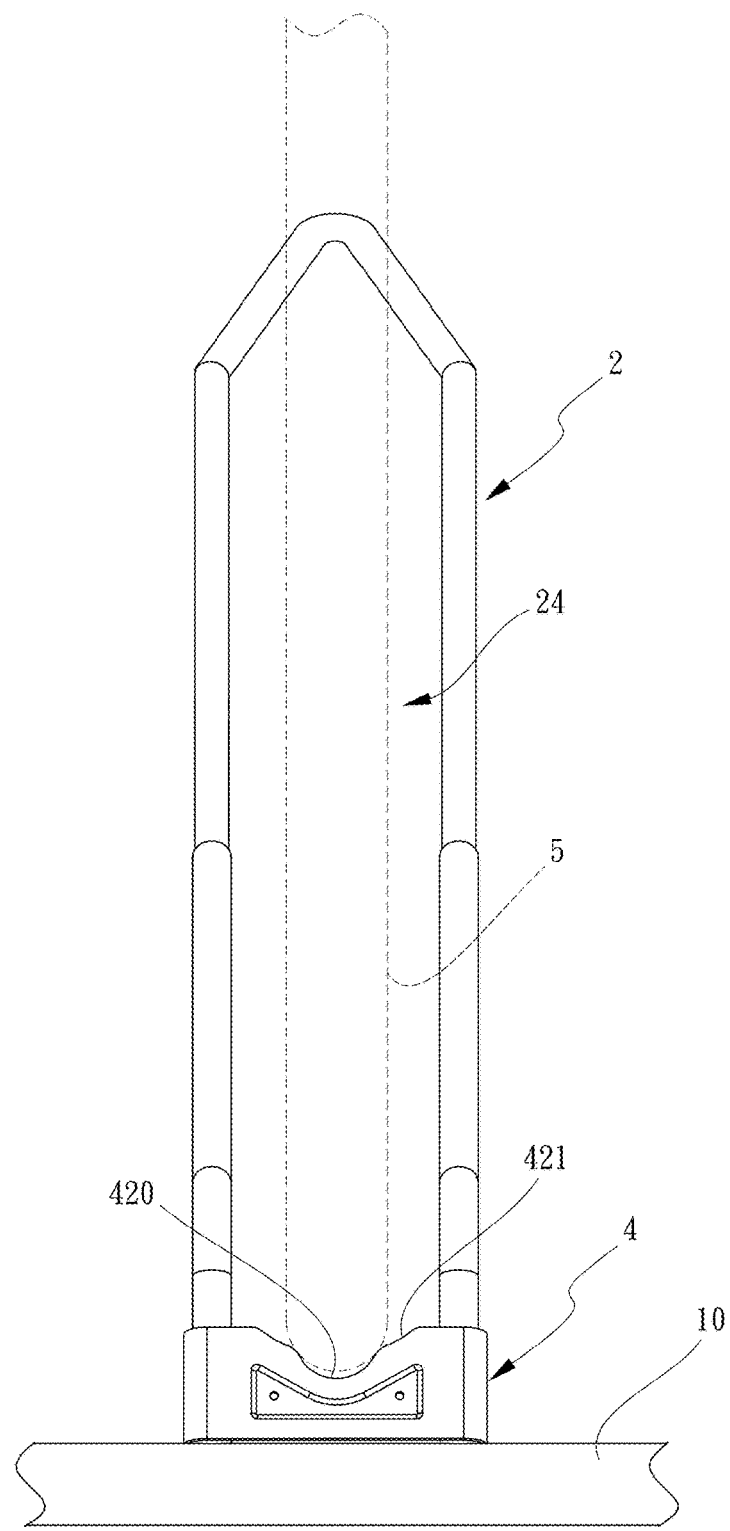
FIG. 9 is a schematic diagram showing a narrow wheel placed in the accommodation space of the present invention.
Figure 10:
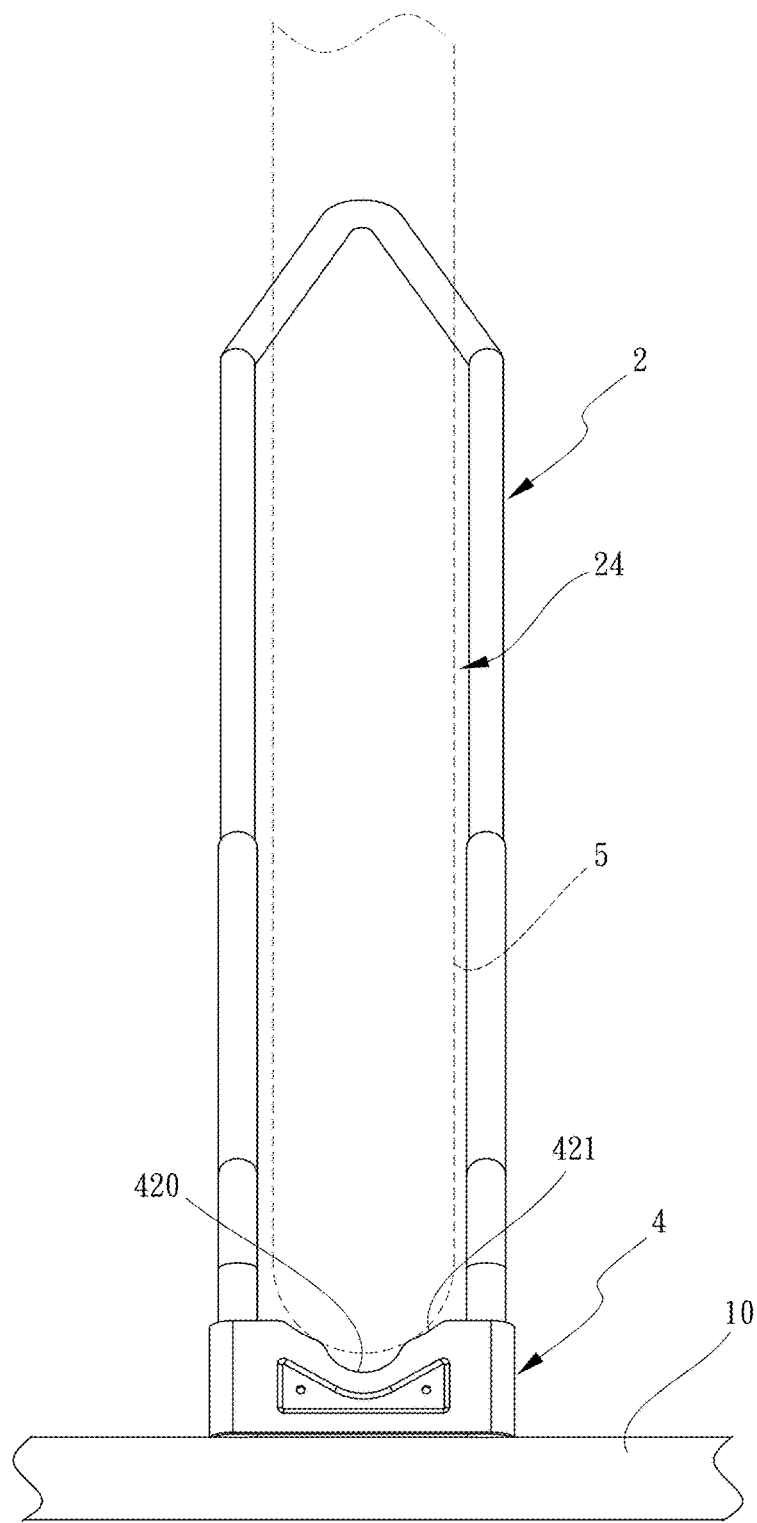
FIG. 10 is a schematic diagram showing a wide wheel placed in the accommodation space of the present invention.
Figure 11:
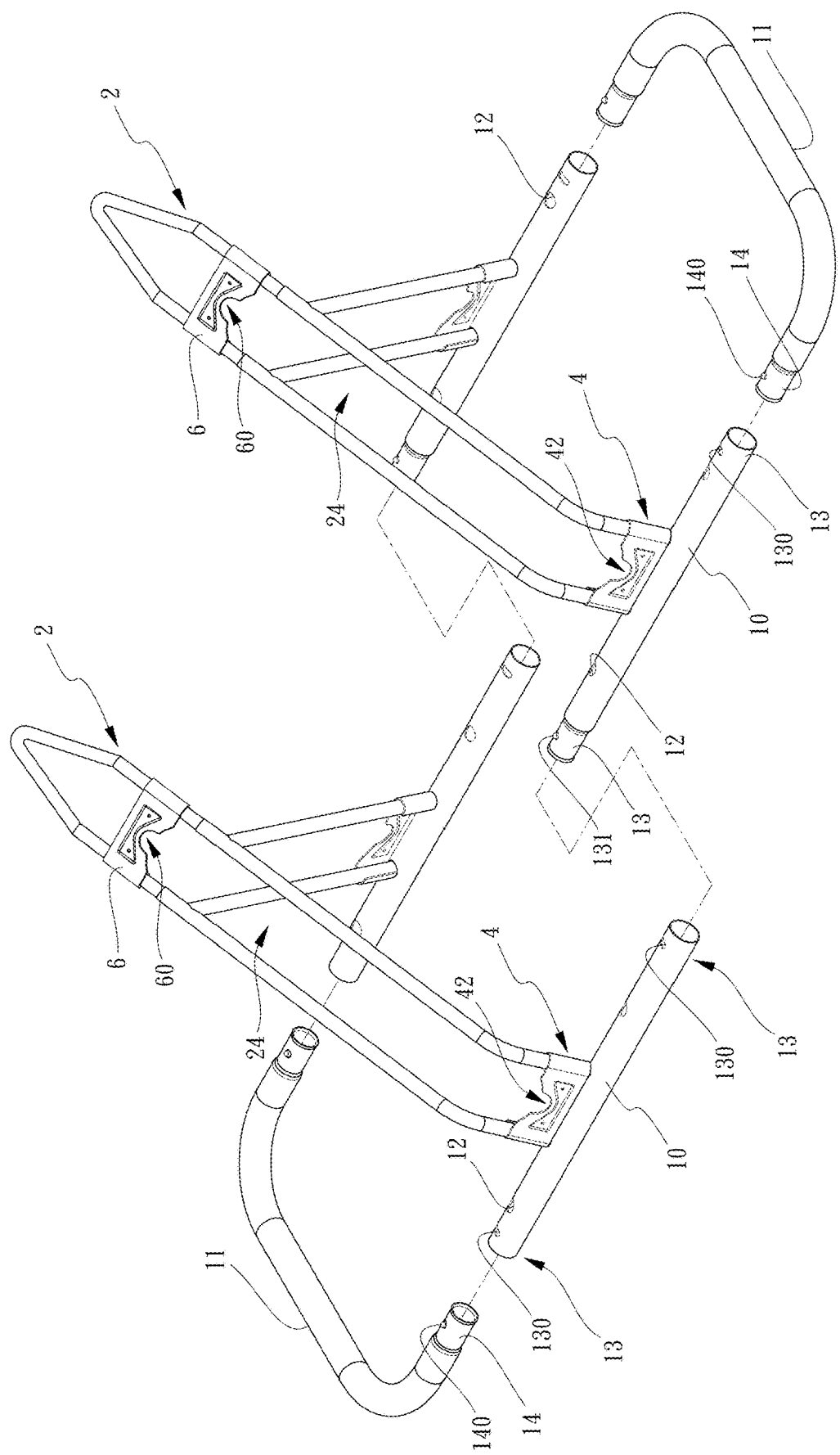
FIG. 11 is an exploded perspective view showing the expanded base size of the present invention.
Figure 12:
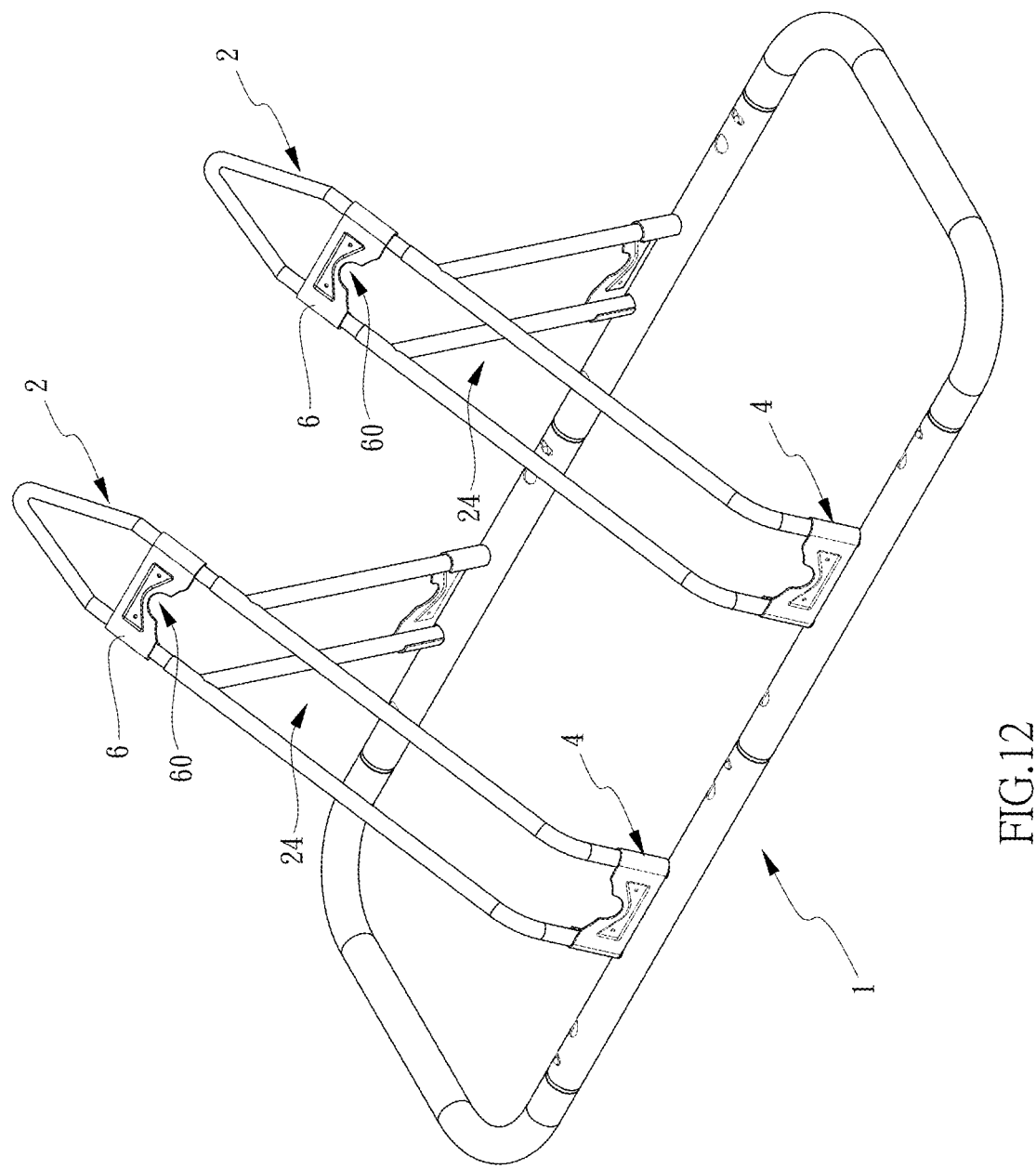
FIG. 12 is an assembled perspective view showing the expanded base size of the present invention.
Figure 13:
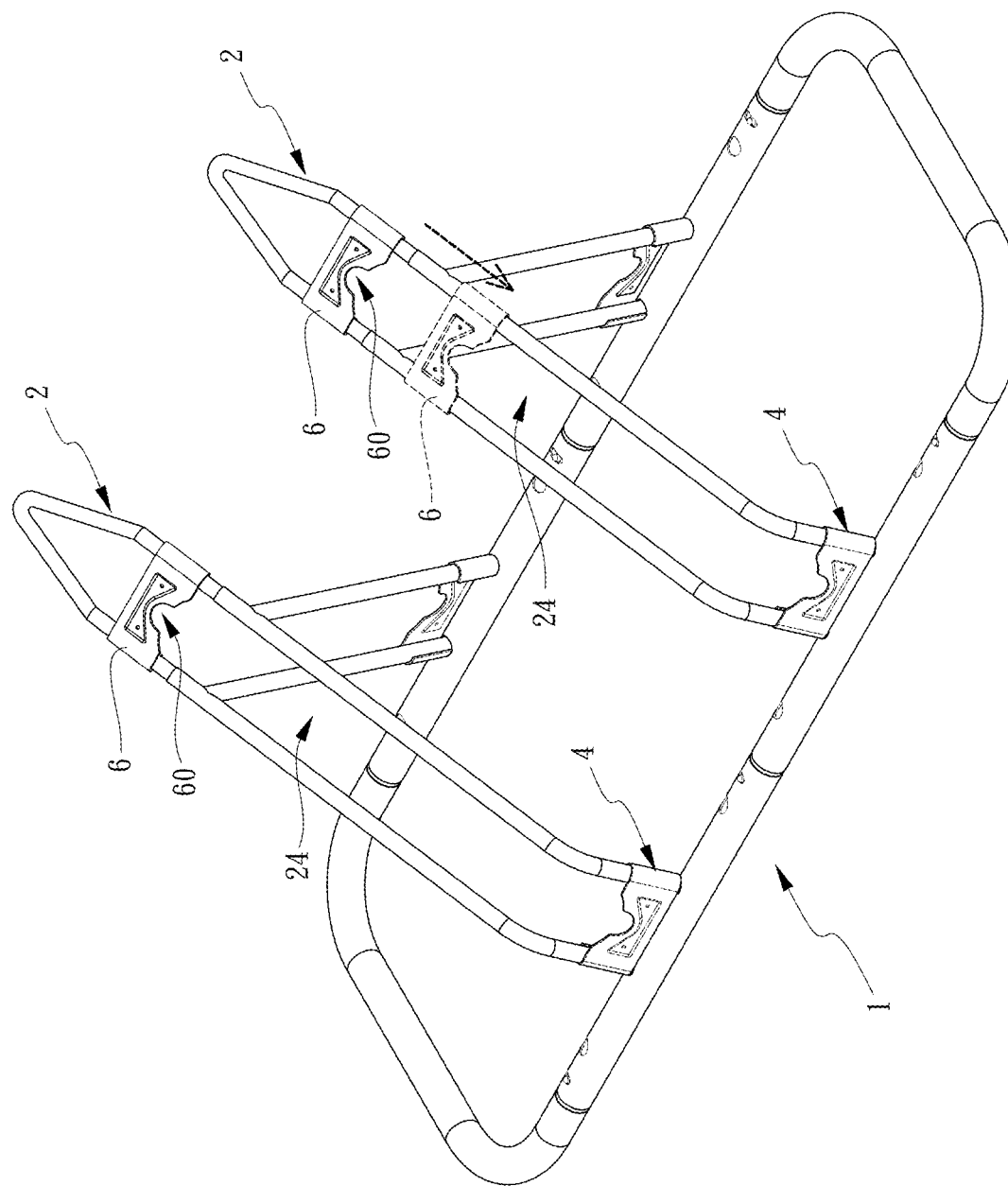
FIG. 13 is a perspective view showing the adjustment of the elastic limiting member position of the present invention.
Figure 14:
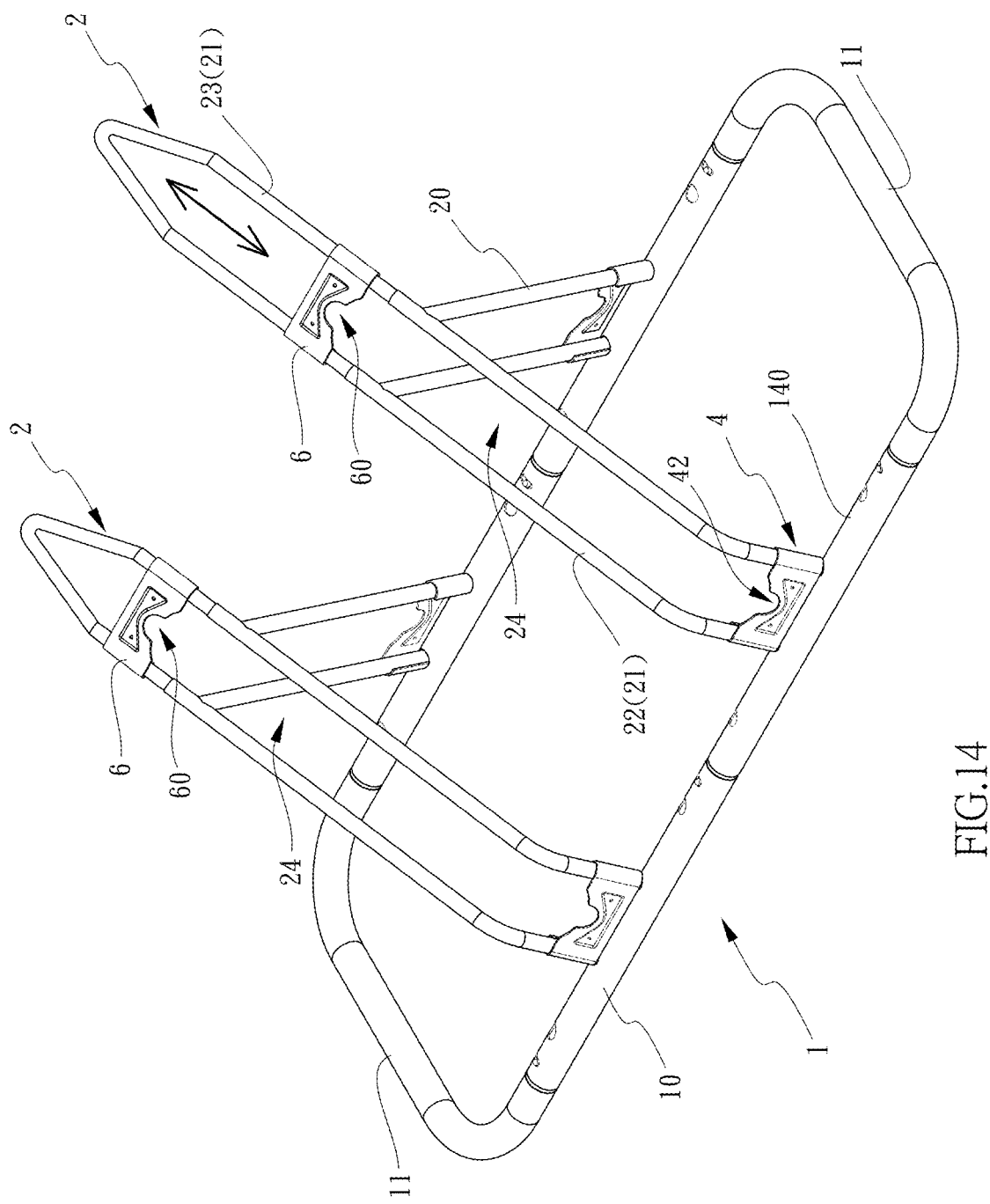
FIG. 14 is a perspective view showing the adjustment of the limiting tube assembly length of the present invention.
Figure 15:
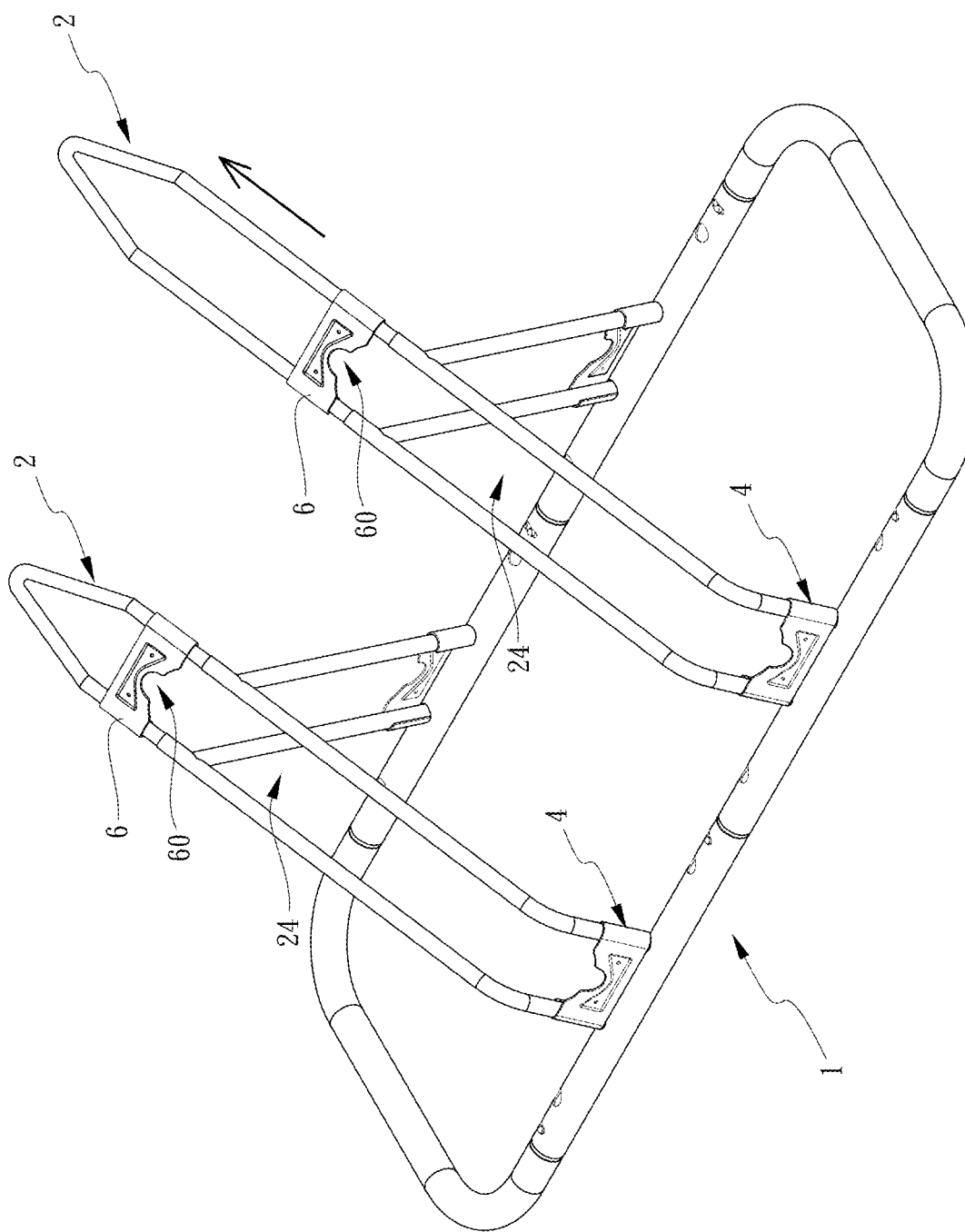
FIG. 15 is a perspective view showing another adjustment of the limiting tube assembly length of the present invention.
Figure 16:
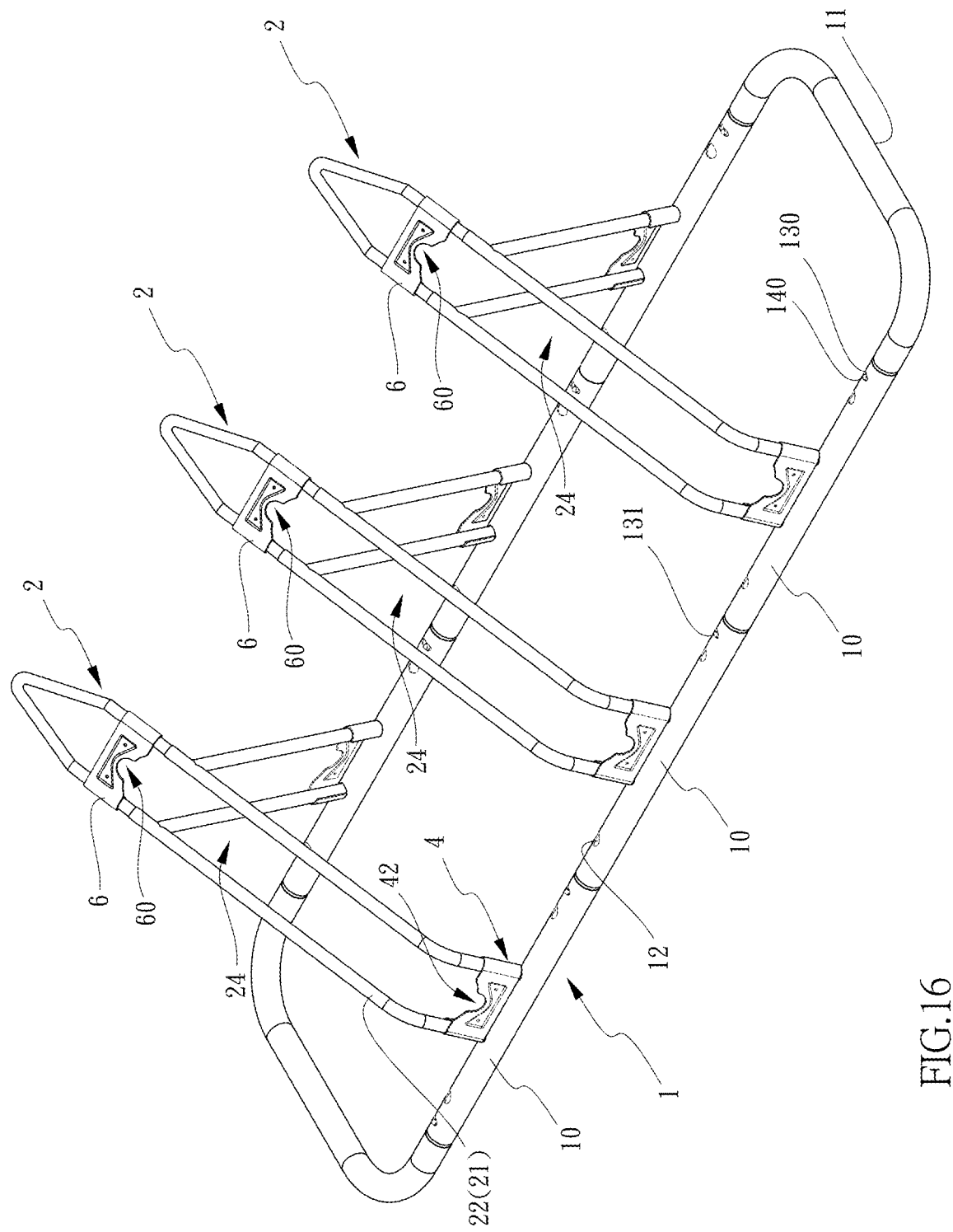
FIG. 16 is a perspective view showing multiple parking tube assemblies installed in the present invention.

A wheel support member 4 is assembled on the limiting tube assembly 21 and adjacent to the base 1. Each wheel support member 4 has two holding parts 40 and a bridge 41 formed between the two holding parts 40. The bridge 41 has a tire support groove 42, and the tire support groove 42 has a narrow tire recess 420 and a wide tire recess 421. The narrow tire recess 420 provides support for wheels 5 of smaller width, such as those found on road bikes, folding bikes, or cruiser bikes (as shown in FIG. 9). The wide tire recess 421 provides support for wheels 5 of larger width, such as those found on mountain bikes (as shown in FIG. 10). Furthermore, the bridge 41 has an inner surface and an outer surface arranged in opposite directions, and both surfaces are non-continuous flat surfaces. The outer surface has a reinforcing recess 410 extending from the outer surface toward the inner surface direction, while the inner surface has a reinforcing protrusion 411 extending in the direction opposite to the reinforcing recess 410. The holding parts 40 of the wheel support member 4 have curled arc-shaped openings. During installation, the openings of the holding parts 40 engage and lock with the tube body of the limiting tube assembly 6, making the installation of the wheel support member 4 and limiting tube assembly 6 quite convenient.

Figure 17:
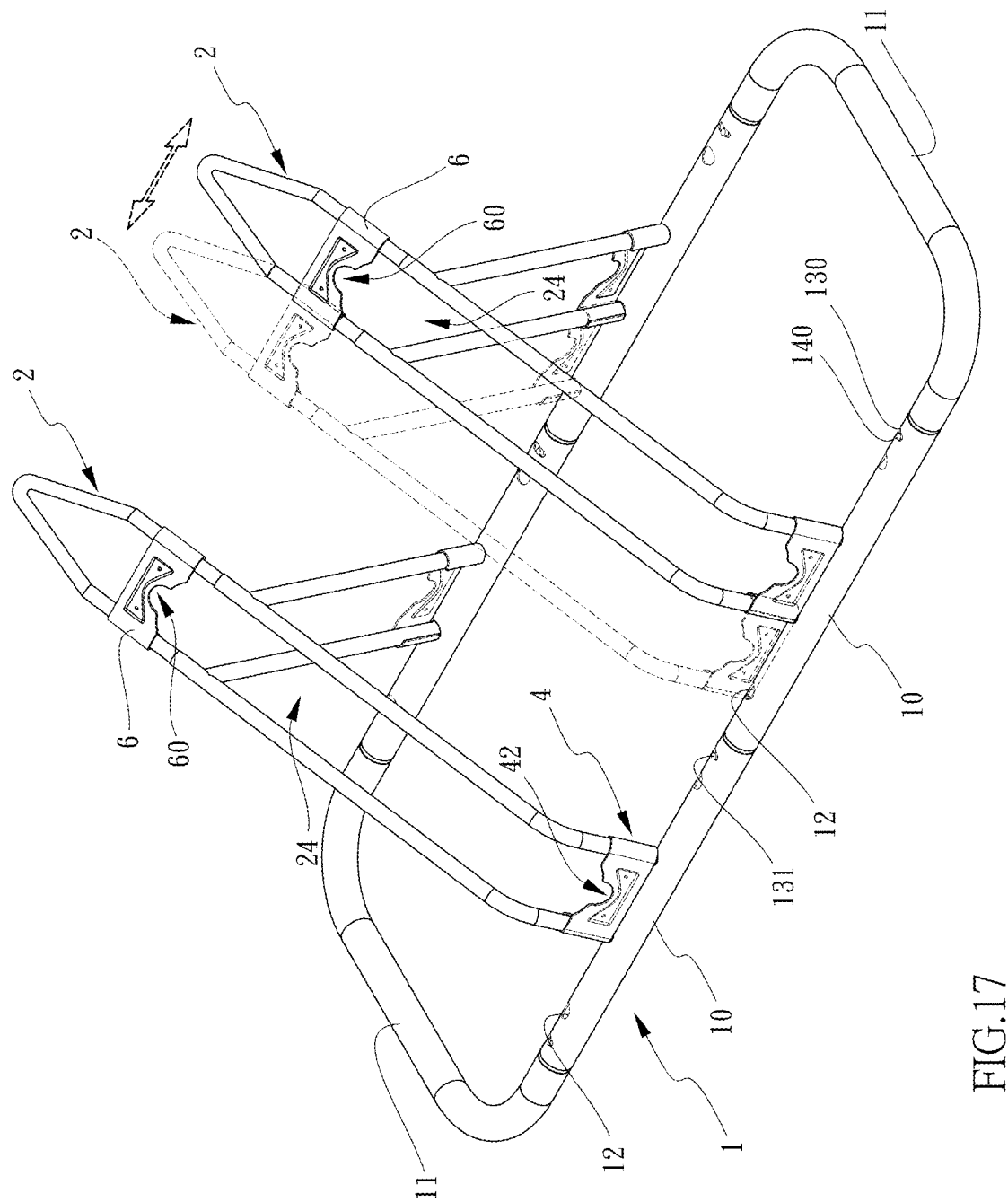
FIG. 17 is a perspective view showing the adjustment of spacing between multiple parking tube assemblies of the present invention.

The parking tube assembly 2 of the present invention provides the accommodation space 24 for straddling and placing the wheel 5, preventing the wheel 5 from contacting the ground. In this embodiment, depending on actual circumstances, the parking tube assembly 2 of the present invention can accommodate either the front wheel or rear wheel of a bicycle. However, when multiple bicycles need to be parked, to prevent handlebars from colliding due to insufficient spacing between multiple parking tube assemblies 2, the position of each parking tube assembly 2 on the base 1 can be adjusted using the multiple adjustment holes 12 of the long tubes 10, ensuring appropriate safety distances between each parking tube assembly 2 (as shown in FIG. 17).

Figure 8:
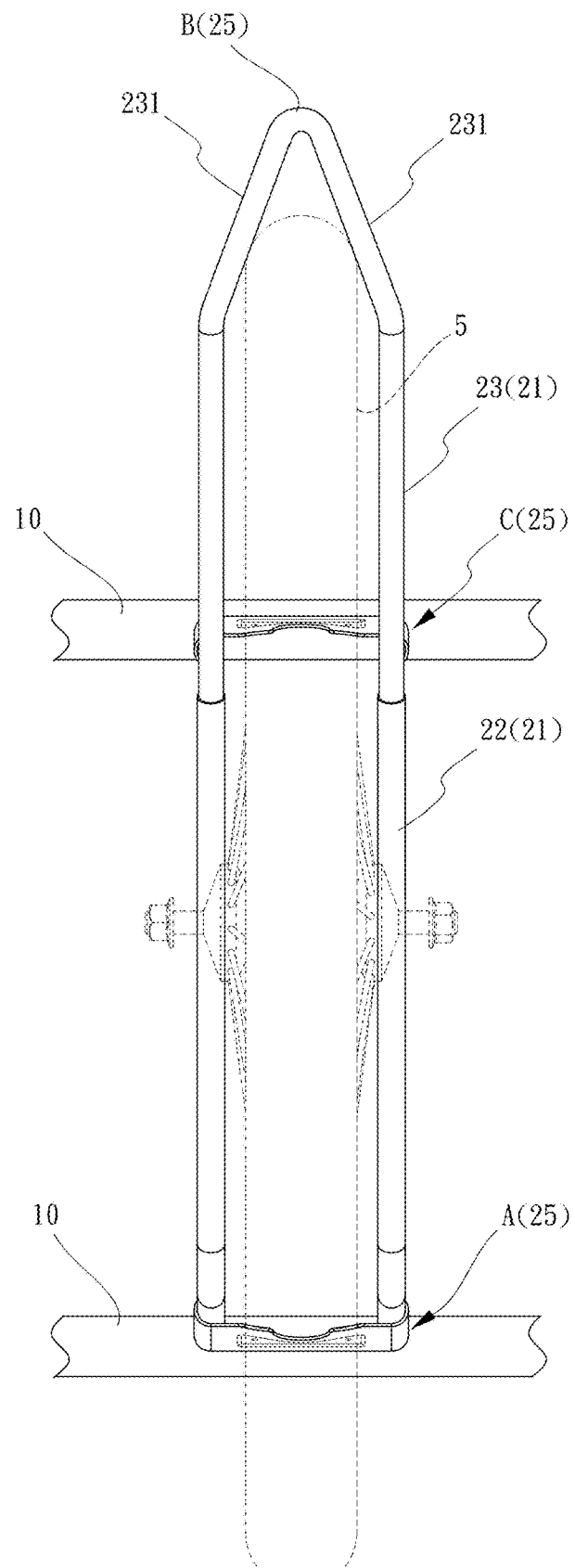
FIG. 8 is a schematic diagram showing the triangular positioning structure of the parking tube assembly of the present invention.

Referring to FIG. 8, the assembly point between the limiting tube assembly 21 of the parking tube assembly 2 and the base 1 forms a first positioning point "A", while the opposite end forms a second positioning point "B", and the assembly point between the fixed tube assembly 20 of the parking tube assembly 2 and the base 1 forms a third positioning point "C". The first positioning point "A", the second positioning point "B", and the third positioning point "C" form a triangular positioning structure 25. Through this triangular positioning structure 25 provided by the parking tube assembly 2, the wheel 5 can be stably placed in the accommodation space 24.

Figure 18:
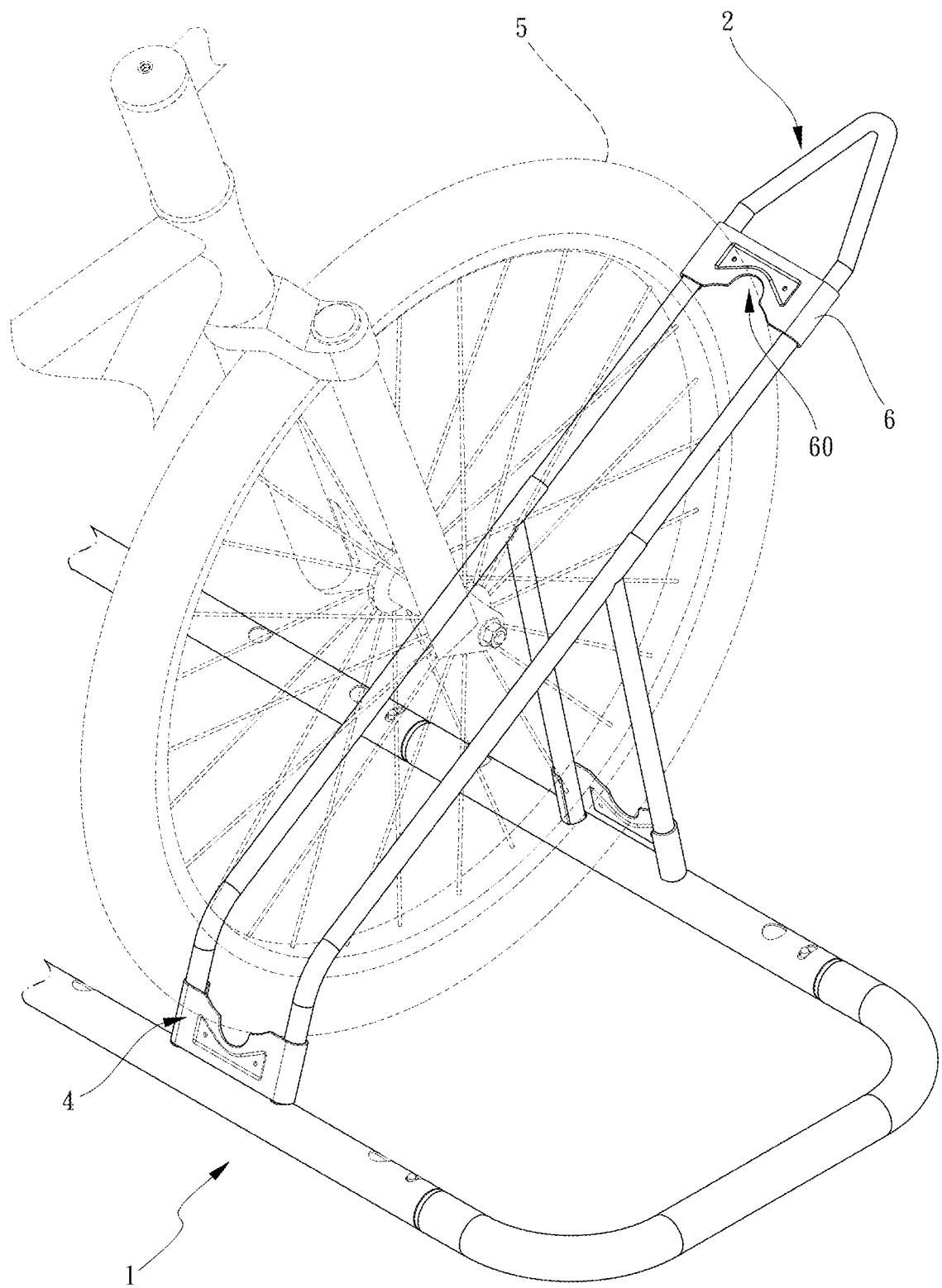
FIG. 18 is a perspective view showing a wheel placed on the elastic limiting member of the present invention.
Figure 19:
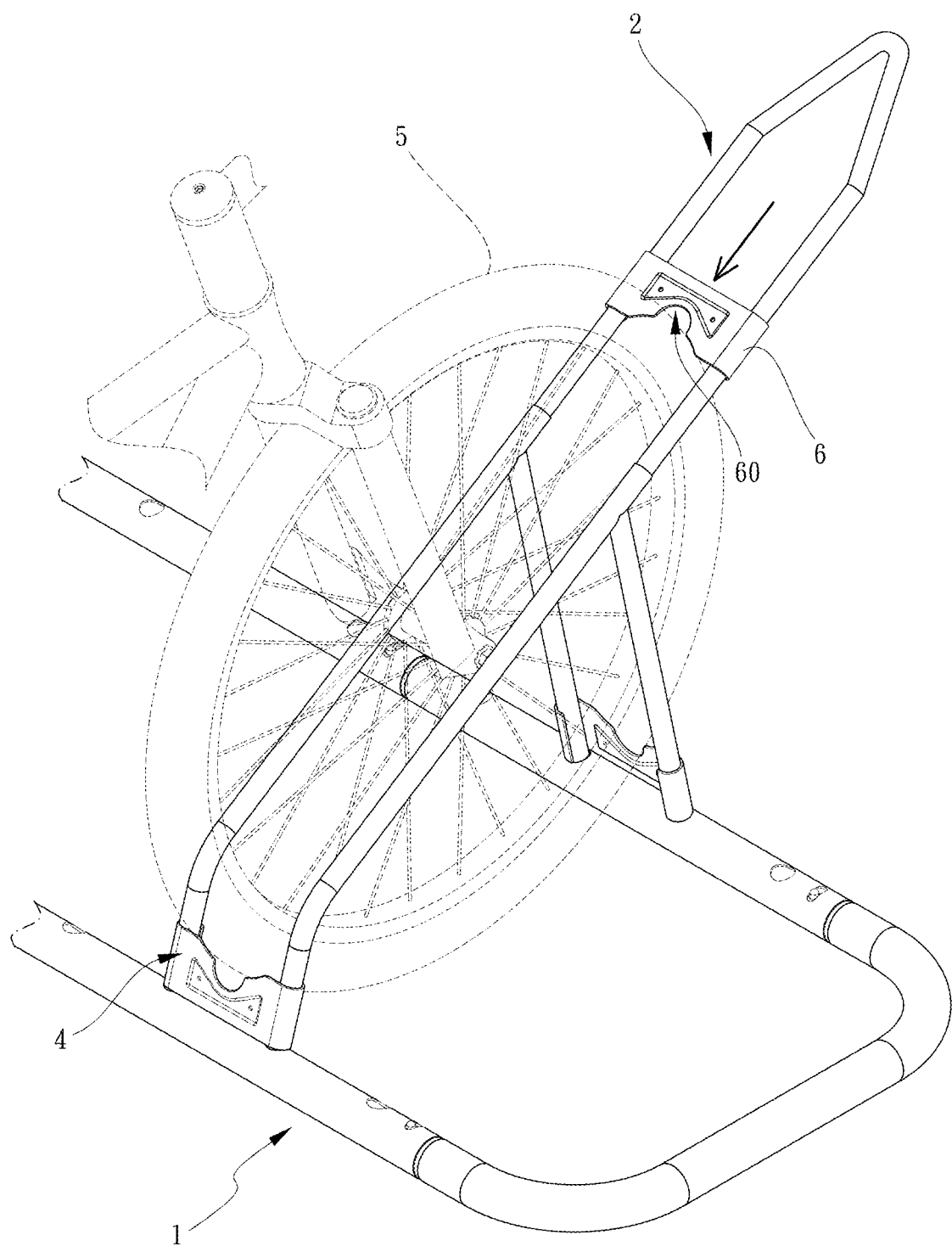
FIG. 19 is a perspective view showing the adjustment of the elastic limiting member position with a wheel placed of the present invention.

It can be understood that the present invention can achieve the effect of adjusting the size of the accommodation space 24 through the up and down movement of the elastic limiting member 6 on the limiting tube assembly 21, accommodating wheels 5 of different sizes. For example, when placing a larger wheel 5, the elastic limiting member 6 is moved upward to increase the accommodation space 24 (as shown in FIG. 18). When placing a smaller wheel 5, the elastic limiting member 6 is moved downward to decrease the accommodation space 24 (as shown in FIG. 19).

Besides adjusting the position of the elastic limiting member 6 to change the size of the accommodation space 24, the present invention can also achieve the same effect by adjusting the length of the limiting tube assembly 21. When parking a smaller wheel 5, the first tubes 22 and the second tubes 23 form a contracted state, and when parking a larger wheel 5, the first tubes 22 and the second tubes 23 form an extended state. In other words, the present invention has two methods for adjusting the size of the accommodation space 24 to achieve the effect of accommodating wheels 5 of different sizes. During the process of parking or removing bicycles, this prevents collision damage with the hub or brake disc of the front wheel, or with the cassette or derailleur of the rear wheel.

While we have shown and described the embodiment in accordance with the present invention, it should be clear to those skilled in the art that further embodiments may be made without departing from the scope of the present invention.

What is claimed is:

1. A bicycle parking device, comprising:
   a base;
   a parking tube assembly connected to the base and having a limiting tube assembly and a fixed tube assembly, the limiting tube assembly having an accommodation space;
   an elastic limiting member movably connected on the limiting tube assembly and being movable up and down relative to the limiting tube assembly to adjust a size of the accommodation space, and
   the limiting tube assembly having two first tubes and two second tubes which are movably inserted in the two first tubes, the two first tubes respectively having a first positioning hole, a positioning member passing through the first positioning hole and abuts against the second tube corresponding thereto.

2. The bicycle parking device as claimed in claim 1, wherein two respective first ends of the limiting tube assembly and the fixed tube assembly are respectively connected to the base, two respective second ends of the limiting tube assembly and the fixed tube assembly are inclined to connect with each other.

3. The bicycle parking device as claimed in claim 1, wherein the accommodation space of the limiting tube assembly is adapted to place a wheel, the elastic limiting member has a limiting groove which is concavely formed on one side thereof and adapted to be located corresponding to the wheel.

4. The bicycle parking device as claimed in claim 3, wherein two respective second ends of the limiting tube assembly are connected to two limiting tubes that are inclined to connect with each other, the two limiting tubes are adapted to clamp two sides of the wheel.

5. The bicycle parking device as claimed in claim 1 further comprising a wheel support member connected to the limiting tube assembly and located adjacent to the base.

6. The bicycle parking device as claimed in claim 5, wherein the wheel support member has two holding parts and a bridge formed between the two holding parts.

7. The bicycle parking device as claimed in claim 6, wherein the bridge has a tire support groove, the tire support groove has a narrow tire recess and a wide tire recess.

8. The bicycle parking device as claimed in claim 6, wherein the bridge has an inner surface and an outer surface arranged in opposite directions, both the inner surface and outer surface are non-continuous flat surfaces, the outer surface has a reinforcing recess directed toward the inner surface, the inner surface has a reinforcing protrusion extending in the direction opposite to the reinforcing recess.

9. The bicycle parking device as claimed in claim 1, wherein a first positioning point is formed between the limiting tube assembly and the base, and an opposite end of the first positioning point forms a second positioning point, a third positioning point is formed between the fixed tube assembly and the base, the first positioning point, the second positioning point, and the third positioning point form a triangular positioning structure.

10. The bicycle parking device as claimed in claim 1, wherein the base has two long tubes and two short tubes that is detachably assembled with each other, the two long tubes have multiple adjustment holes and have first joining parts at both ends respectively, and the two short tubes have multiple second joining parts at both ends corresponding to each first joining part.

11. The bicycle parking device as claimed in claim 10, wherein each first joining part has a first through hole, and each second joining part has a first elastic snap button corresponding to the first through hole.

12. The bicycle parking device as claimed in claim 10, wherein the each first joining part has a first through hole and a second elastic snap button, and each second joining part has a first elastic snap button and a second through hole corresponding respectively to the first through hole and the second elastic snap button.

13. The bicycle parking device as claimed in claim 10, wherein the limiting tube assembly is assembled to any of the adjustment holes of the two long tubes of the base.

* * * * *